T. G. SCHMEISER.
EARTH WORKING AND HANDLING MACHINE.
APPLICATION FILED MAR. 9, 1914.
1,150,459.
Patented Aug. 17, 1915.
2 SHEETS—SHEET 1.
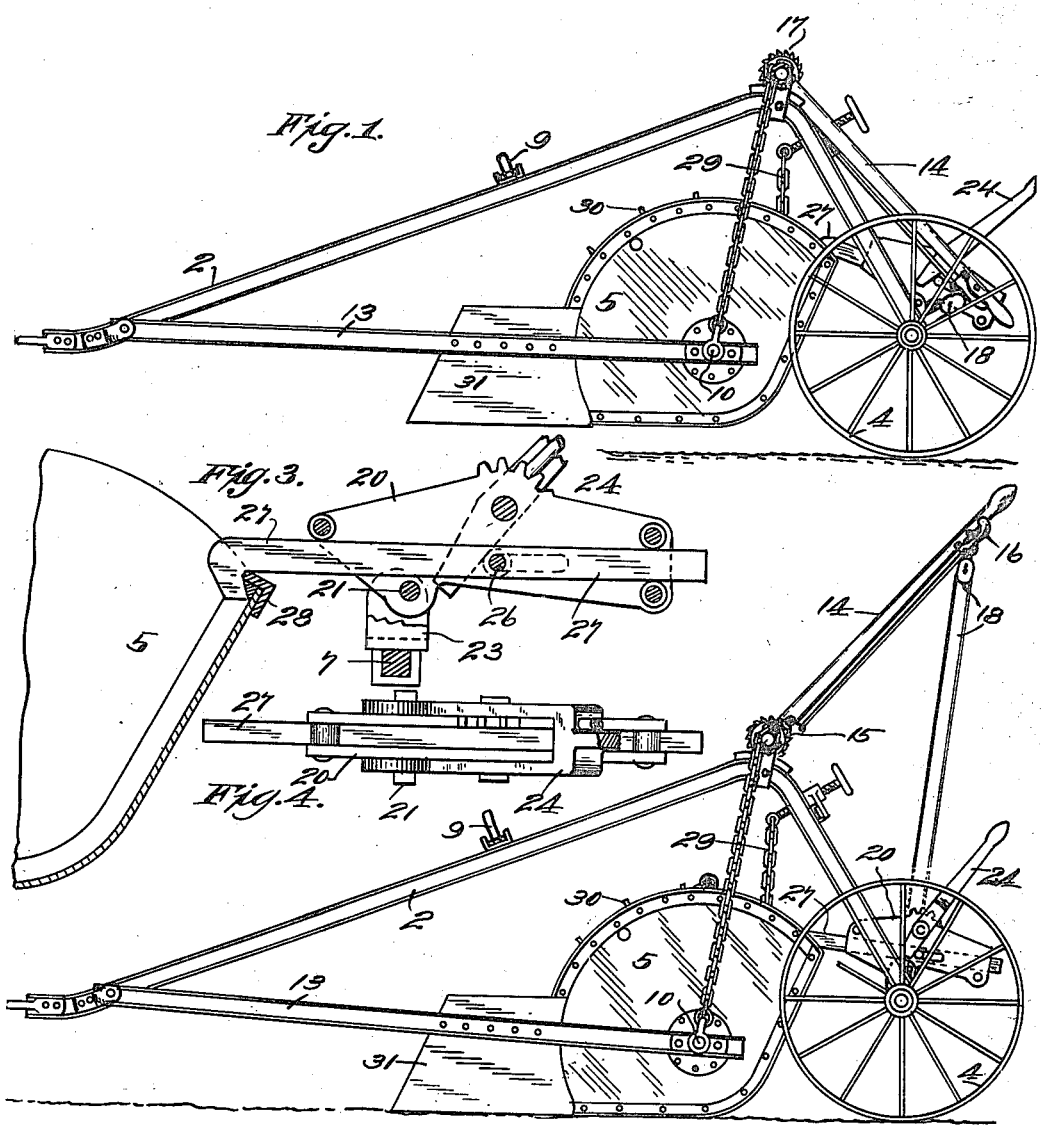
WITNESSES:
F. E. Maynard
Thos. Geo. Weeg
INVENTOR
Theodore G. Schmeiser,
By G. H. Strong.
ATTORNEY

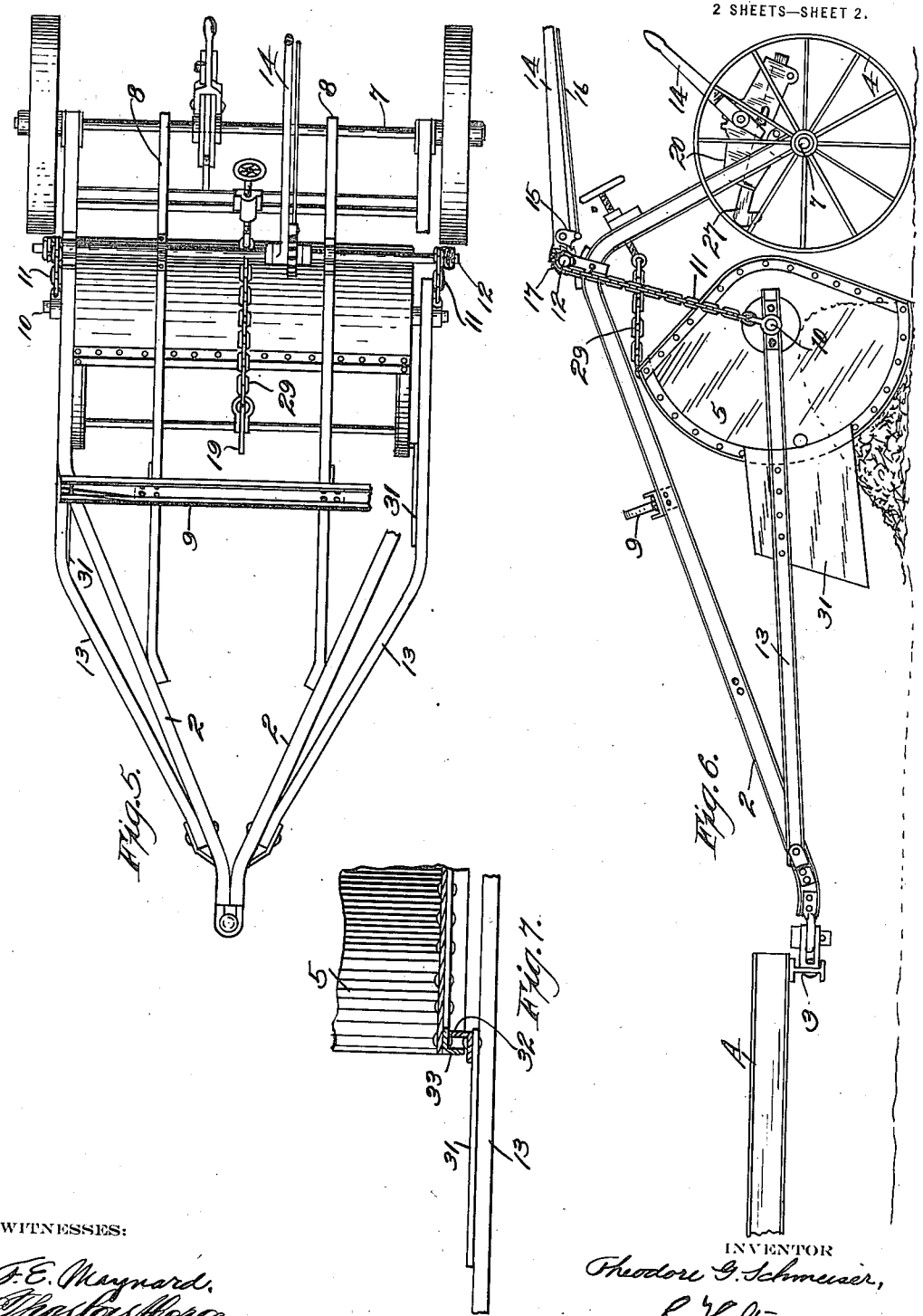

UNITED STATES PATENT OFFICE.

THEODORE G. SCHMEISER, OF DAVIS, CALIFORNIA.

EARTH WORKING AND HANDLING MACHINE.

1,150,459. Specification of Letters Patent. Patented Aug. 17, 1915.

Application filed March 9, 1914. Serial No. 823,410.

*To all whom it may concern:*

Be it known that I, THEODORE G. SCHMEISER, a citizen of the United States, residing at Davis, in the county of Yolo and State of California, have invented new and useful Improvements in Earth Working and Handling Machines, of which the following is a specification.

This invention relates to a machine capable of use with suitable traction means as a combined scraper, leveler, checker, ditcher, scarifier and road planer; although in this case I have shown it only as adapted as a scraper.

The invention consists of the parts and the combination and construction of parts as hereinafter more fully described and claimed, having reference to the accompanying drawings, in which—

Figure 1 is a side elevation of the invention with the scraper in raised position. Fig. 2 is a similar view with the scraper in lowered position. Fig. 3 is a side elevation in partial section of the scraper latch. Fig. 4 is a plan of the latch. Fig. 5 is a plan of the machine. Fig. 6 is a side elevation of the machine with the scraper in raised position acting as a leveler, and also in its dumping position. Fig. 7 is a detail in plan and partial section of a fragment of the bucket and side apron.

The invention is designed especially for use as a trailer behind a traction engine, which latter is represented by the character A.

2 is the trailer frame adapted to be connected at the front end to the draw bar 3 of the traction engine, and mounted at the rear end are suitable widely spaced wheels 4. The frame 2 is of special and important design, because it must be so constructed and arranged and so mounted as to support the scraper 5, or such other instrument as may be employed beneath it; the scraper or other instrument being so supported and hung within and beneath the frame that it can be raised and lowered, dumped and provided with all the necessary adjustments. To this end the frame 2 is essentially A-shaped in plan, with the apex at the draw bar, and with the rear wide spreading portion bent at right angles downwardly to form legs which connect with and are supported on the axle 7. Preferably this A-frame is of stout, I or channel iron construction with supplemental angularly bent braces 8 also connected to the axle 7; and to give additional rigidity and strength the main body of the frame, including the braces 8, may be connected across by suitable truss connection 9.

The scraper 5 is hung by its axle 10 from the chains 11 which extend upward and are wrapped around and suitably secured to the drum shaft 12 journaled at the top of the frame 2 near its rear bend. Turning shaft 12 will raise and lower the scraper.

Proper alinement and position of the scraper is maintained by a pair of radius rods 13, having their front ends pivoted to the front end of the frame 2, and the rear spreading ends pivoted to the axle 10 of the scraper.

The raising and lowering of the scraper is effected by means of a lever 14 acting on the drum shaft 12 to wind or unwind the chains 11. Preferably lever 14 is a ratchet lever having a pawl 15 and the usual hand releasing means 16; the pawl engaging a ratchet 17 fixed on the drum shaft 12. With a light load the scoop or scraper can be lifted by a hand manipulation of the lever 14, but where a very heavy load is carried (for example as much as 7 yards of earth have been transported by one of these machines at one time) a suitable power appliance as a block and tackle 18 is connected with the outer end of the lever and the axle 7, thereby giving the necessary leverage.

The scraper axle 10 preferably extends the entire length of the scraper; the latter being reinforced at intervals by division plates 19; the axle and division plates 19 giving great rigidity and strength as is required to the scraper.

The scraper is held at any desired incline when acting as a scraper, or when transporting the load, by appropriate means as a latch mechanism, as shown in detail in Figs. 3 and 4. This latch mechanism consists of a guide 20 having a fulcrum 21 on clip 23 fixed on the axle 7; this guide carrying a lever 24 shiftable and engaging a part 26 on the latch or dog 27, which is slidably mounted in the block 20. The dog 27 is adapted to extend over and into the path of the rear edge 28 of the scraper 5, Fig. 3, to maintain the scraper with its bottom level, or more or less inclined, according to the amount of scraping action it is desired to give to the scraper. In other words, the tilt of the lower cutting edge of the scraper can be varied by suitably manipulating the hand lever 25.

In operation with the parts arranged in the position shown in Fig. 2, with the scraper lowered, if it is desired to dig deeper the hand lever 24 is adjusted to lengthen the projection of the latch and slightly tilting upward the tiltable block 20. When the load has been gathered the lever 14 is operated to raise the scraper and radius rods 13 into position, as shown in Fig. 1.

To dump the load, pressure is applied on the hand lever 24 to rock the block and release the latch 27 whereupon the parts assume the position shown in Fig. 6; the further rotation of the scraper being limited by suitable means, as the chain 29. Under some circumstances however, it may be desired to let the scraper turn clear over, in which case the chain 29 is disconnected and the scraper revolves on or with its axle 10, as a pivot. The rotation of the scraper may be facilitated by the projecting radial pins 30, Fig. 2. When working in loose, dry sand where much of the load might otherwise be lost, it is desired in some instances to attach the cheek plates or side aprons 31. These are fastened to the radius rods or frames 13 immediately in front of the scraper and having inturned flanges 32, Fig. 7, working in behind the corresponding flanges 33 on the scraper.

Having thus described my invention what I claim and desire to secure by Letters Patent is—

1. An earth working machine consisting of an angular frame, the angle portion opening downward, a scraper mounted on a shaft which extends through the scraper, chains connected with the ends of the shaft, a drum shaft mounted at the apex of the frame and with which the opposite ends of said chains connect, radius rods connected with the scraper shaft and the frame to limit the forward and backward movement of the scraper, means for rotating the drum shaft to raise and lower the scraper, and means for limiting the rotative movement of the scraper, said last-named means including an extendible latch member engageable with the scraper.

2. In an earth working machine, a wheeled frame, a carrier pivoted at its front to the frame, a scraper pivoted to the rear end of the carrier, said scraper being arranged in spaced relation to and in front of the wheels and the axle thereof, a guide pivotally connected to the axle of the wheels, a latch for engagement with the scraper slidingly carried by the guide, a pivoted hand lever on the guide, and means to connect said lever to the latch to slide the latter.

3. In an earth working machine, a wheeled frame, a carrier pivoted at its front to the frame, a scraper pivoted to the rear end of the carrier, said scraper being arranged in spaced relation to and in front of the wheels and the axle thereof, a slidable latch to engage the scraper, a movable device for supporting the latch in connection with the frame, and means carried by said device and movable therewith for effecting movement of the latch and for locking same against movement.

4. In an earth working machine, a frame consisting of a pair of side members which are spread apart at their rear ends and converge and are connected at their front ends, said side members having forwardly inclined long front portions and rearwardly inclined short rear portions to form a scraper housing beneath the side members, a carrier composed of a pair of rods which are spaced apart at their rear ends and converge at their front ends and are pivoted to the front end of the frame, a scraper pivotally mounted in the space between the rear ends of said rods, wheels at the rear end of the frame, means connected to the rear of the scraper and to the frame to raise and lower the scraper, and means to hold the scraper against dumping movement.

5. In an earth working machine, an arched frame comprising a plurality of continuous metal beams, each bent to substantially right angular shape with a long forward leg and a rear short leg, traction wheels, an axle therefor on which the rear short legs of the frame engage, the longer forward legs of the arched portions of the frame converging at the front and adapted to be secured to a tractor, a scraper member suspended from the apex of the frame arch and proximate to the axle, means operating from the frame arch for raising and lowering the scraper member, and steadying means extending from the tractor end of the frame back to the scraper.

6. In an earth working machine, a frame composed of side members each having an arched portion between its ends, a wheeled axle connected to the rear ends of the side members, rods pivoted to the front end of the frame and having their rear ends extending in the arched portions of the side members, a scraper in the arched portions pivoted to the rear ends of the rods, means on the arched portion to raise and lower the scraper, and means on the axle to engage the scraper to hold same against dumping movement and adapted to be released therefrom at the will of the operator to permit of dumping.

7. In an earth working machine, traction wheels, a connecting axle therefor, an arched frame having a short, downwardly inclined, rear leg portion engaging the axle and an angularly disposed, inclined longer leg portion extending forwardly to a plane below the axle, the apex of the arched frame being arranged in proximity to and above the axle, a scraper suspended from the apex of the frame, and connecting means extending forwardly from the scraper to the free end of the longer leg portion.

8. In an earth working machine, a supporting frame, a carrier pivoted to the frame, a scraper movably connected to the carrier, means to raise and lower the scraper, a guard plate connected to each side of the carrier and interengaging means between the respective plates and the opposite sides of the scraper.

9. In an earth working machine, a supporting frame, a carrier pivoted to the frame, a scraper movably connected to the carrier, means to raise and lower the scraper, a guard plate connected to each side of the carrier and having an inwardly extending flange at its rear end, and means on the scraper sides arranged over the respective guard plate flanges to coöperate with the latter.

In testimony whereof I have hereunto set my hand.

THEODORE G. SCHMEISER.

Witness:
JOHN H. HERRING.